(12) United States Patent
Chen et al.

(10) Patent No.: US 11,143,797 B2
(45) Date of Patent: Oct. 12, 2021

(54) OPTICAL FILM STRUCTURE, MANUFACTURING METHOD THEREOF AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yinwei Chen, Beijing (CN); Xuqing Feng, Beijing (CN); Zhenxing Luo, Beijing (CN); Liang Xiao, Beijing (CN); Guangquan Wang, Beijing (CN); Haiwei Sun, Beijing (CN); Fei Gao, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/614,088

(22) PCT Filed: Mar. 25, 2019

(86) PCT No.: PCT/CN2019/079474
§ 371 (c)(1),
(2) Date: Nov. 15, 2019

(87) PCT Pub. No.: WO2019/184854
PCT Pub. Date: Oct. 3, 2019

(65) Prior Publication Data
US 2020/0264344 A1    Aug. 20, 2020

(30) Foreign Application Priority Data

Mar. 27, 2018 (CN) .......................... 201810259457.2

(51) Int. Cl.
*G02B 3/00* (2006.01)
*G02F 1/1335* (2006.01)
(Continued)

(52) U.S. Cl.
CPC ......... *G02B 3/0006* (2013.01); *G02B 5/0221* (2013.01); *G02B 5/0278* (2013.01);
(Continued)

(58) Field of Classification Search
None
See application file for complete search history.

(56) References Cited

U.S. PATENT DOCUMENTS 6,721,102 B2    4/2004   Bourdelais et al.
9,081,228 B2    7/2015   Jang et al.
(Continued)

FOREIGN PATENT DOCUMENTS

CN    1249818 A    4/2000
CN    1444057 A    9/2003
(Continued)

OTHER PUBLICATIONS

International Search Report and Written Opinion, for International Application No. PCT/CN2019/079474, dated Jul. 9, 2019, 16 pages.
(Continued)

*Primary Examiner* — Phu Vu
(74) *Attorney, Agent, or Firm* — Westman, Champlin & Koehler, P.A.

(57) ABSTRACT

A display device is provided. The display device includes a display screen and an optical film structure arranged on a light exiting side of the display screen. The optical film structure includes a substrate layer and a first micro-lens array layer, where the substrate layer has a first surface and a second surface opposite to each other; the first micro-lens array layer is provided on at least one of the first surface and
(Continued)

the second surface, and includes multiple micro-lenses arranged in sequence, each of the multiple micro-lenses has a size smaller than that of a sub-pixel, and edges of adjacent micro-lenses abut on each other.

17 Claims, 5 Drawing Sheets

(51) Int. Cl.
*G02F 1/1343* (2006.01)
*G02B 5/02* (2006.01)

(52) U.S. Cl.
CPC .. *G02F 1/133504* (2013.01); *G02F 1/133526* (2013.01); *G02F 1/133528* (2013.01); *G02F 1/134309* (2013.01); *G02F 1/133562* (2021.01); *G02F 1/134345* (2021.01)

(56) References Cited

U.S. PATENT DOCUMENTS

| | | | |
|---|---|---|---|
| 10,274,741 B2 | 4/2019 | Bang et al. | |
| 2002/0098257 A1* | 7/2002 | Ikeda | G02F 1/133553 425/374 |
| 2003/0169514 A1 | 9/2003 | Bourdelais et al. | |
| 2013/0329164 A1 | 12/2013 | Jang et al. | |
| 2015/0192705 A1* | 7/2015 | Nimura | G02B 3/0006 359/621 |
| 2017/0102583 A1 | 4/2017 | Ito | |
| 2017/0315372 A1 | 11/2017 | Bang et al. | |
| 2018/0284534 A1 | 10/2018 | Song et al. | |
| 2019/0094519 A1* | 3/2019 | Komatsu | G02B 25/001 |
| 2019/0384066 A1* | 12/2019 | Deng | G02B 3/0056 |

FOREIGN PATENT DOCUMENTS

| | | |
|---|---|---|
| CN | 101520522 A | 9/2009 |
| CN | 103487975 A | 1/2014 |
| CN | 105667042 A | 6/2016 |
| CN | 106707610 A | 5/2017 |
| CN | 107454380 A | 12/2017 |
| CN | 108445558 A | 8/2018 |

OTHER PUBLICATIONS

First Office Action, including Search Report, for Chinese Patent Application No. 201810259457.2, dated Apr. 15, 2019, 15 pages.

* cited by examiner

OPTICAL FILM STRUCTURE, MANUFACTURING METHOD THEREOF AND DISPLAY DEVICE

CROSS-REFERENCE TO RELATED APPLICATION

The present application is the U.S. national phase of PCT Application No. PCT/CN2019/079474 filed on Mar. 25, 2019, and priority to Chinese patent application No. 201810259457.2 filed in China on Mar. 27, 2018, the disclosures of which are incorporated herein by reference in their entireties.

TECHNICAL FIELD

The present disclosure relates to the field of display technology, in particular to an optical film structure, a method of manufacturing an optical film structure and a display device with the optical film structure.

BACKGROUND

Nowadays, in order to achieve sense of immersion, Virtual Reality (VR)/Augmented Reality (AR) display device usually has a wide display angle. As a result, pixels of a display screen are magnified several times when the display screen is magnified by lenses, such that display detail of individual pixel may be easily viewed by human eyes, leading to reduced picture clarity. That is, generally, display screens of related technologies may only satisfy the requirement of human eyes on picture clarity when viewed directly.

SUMMARY

For additional aspects and advantages of the present disclosure, a part thereof will be set forth in the description which follows and, a part thereof will be apparent from the description, or may be learned by practice of the present disclosure.

According to an aspect of the present disclosure, a display device is provided. The display device includes: a display screen and an optical film structure arranged on a light exiting side of the display screen, where the display device includes a plurality of sub-pixels, and the optical film structure includes: a substrate layer, having a first surface and a second surface opposite to each other, and a micro-lens array layer, provided on at least one of the first surface and the second surface, and including a plurality of micro-lenses arranged in sequence, where each of the plurality of micro-lenses has a size smaller than a size of each of the plurality of sub-pixels, and edges of the adjacent micro-lenses abut on each other.

In an exemplary embodiment of the present disclosure, the micro-lens array layer is arranged on the first surface; the optical film structure further includes a diffusion layer provided on at least one of a surface of the micro-lens array layer away from the substrate layer and the second surface; and the diffusion layer includes a plurality of uneven microstructures.

In an exemplary embodiment of the present disclosure, the micro-lens array layer is arranged on the first surface; the optical film structure further includes a diffusion layer provided on a surface of the micro-lens array layer away from the substrate layer; the diffusion layer includes a plurality of uneven microstructures; and the second surface is connected to the display screen.

In an exemplary embodiment of the present disclosure, the display screen includes a polarizer; and the second surface is directly attached to the polarizer by suction.

In an exemplary embodiment of the present disclosure, the display screen includes a polarizer; and the second surface is adhered to the polarizer.

In an exemplary embodiment of the present disclosure, the micro-lens array layer is provided on each of the first surface and the second surface; the optical film structure further includes a diffusion layer provided on a surface of the micro-lens array layer away from the substrate layer; the diffusion layer includes a plurality of uneven microstructures; and the display device further includes an adhesive layer provided between the micro-lens array layer on the second surface and the display screen.

In an exemplary embodiment of the present disclosure, a focal length f of each of the plurality of micro-lenses satisfies:

$$\frac{l*t}{2*A} < f < \frac{t}{2},$$

where $$A = \frac{3l}{2} - \frac{25.4}{PPI},$$

l is an edge length of the micro-lens, t is a distance between a side of the micro-lens array layer close to the display screen and a sub-pixel of the display screen, and PPI is the quantity of the sub-pixels per inch of the display screen.

In an exemplary embodiment of the present disclosure, the display screen includes an upper base substrate, a lower base substrate, a liquid crystal layer, a sub-pixel electrode layer and a polarizer; the upper base substrate and the lower base substrate are arranged opposite to each other, the liquid crystal layer is disposed between the upper base substrate and the lower base substrate; the sub-pixel electrode layer is arranged on a side of the upper base substrate close to the lower base substrate; the polarizer is arranged on a side of the upper base substrate away from the lower base substrate; and the micro-lens array layer is arranged on the first surface; the second surface is directly attached to the polarizer by suction; and t is a sum of a thickness of the substrate layer, a thickness of the polarizer and a thickness of the upper base substrate.

In an exemplary embodiment of the present disclosure, the optical film structure further includes a diffusion layer provided on a surface of the micro-lens array layer away from the substrate layer; and the diffusion layer includes a plurality of uneven microstructures.

In an exemplary embodiment of the present disclosure, heights and/or edge lengths of the micro-lenses are randomly distributed.

In an exemplary embodiment of the present disclosure, an alignment direction of the micro-lenses of the optical film structure is at an angle to an alignment direction of the sub-pixels of the display screen.

In an exemplary embodiment of the present disclosure, the angle is 18.4 degrees, 33.7 degrees or 45 degrees.

In an exemplary embodiment of the present disclosure, the display device further includes: an adhesive layer, provided between the optical film structure and the display screen, configured to adhere the optical film structure to the light exiting side of the display screen.

According to an aspect of the present disclosure, an optical film structure is provided. The optical film structure includes: a substrate layer, having a first surface and a second surface opposite to each other, and a micro-lens array layer, provided on at least one of the first surface and the second surface, and including a plurality of micro-lenses arranged in sequence, where edges of the adjacent micro-lenses abut on each other.

In an exemplary embodiment of the present disclosure, the micro-lens array layer is arranged on the first surface; the optical film structure further includes a diffusion layer provided on at least one of a surface of the micro-lens array layer away from the substrate layer and the second surface; and the diffusion layer includes a plurality of uneven microstructures.

In an exemplary embodiment of the present disclosure, the micro-lens array layer is provided on each of the first surface and the second surface; the optical film structure further includes a diffusion layer provided on a surface of the micro-lens array layer away from the substrate layer; the diffusion layer includes a plurality of uneven microstructures According to an aspect of the present disclosure, a method of manufacturing an optical film structure is provided. The method includes: forming a substrate layer having a first surface and a second surface opposite to each other; forming a micro-lens array layer on at least one of the first surface and the second surface, where the micro-lens array layer includes a plurality of micro-lenses arranged in sequence, and edges of the adjacent micro-lenses abut on each other.

In an exemplary embodiment of the present disclosure, the forming the micro-lens array layer on at least one of the first surface and the second surface includes: coating an ultraviolet (UV) curable adhesive on the at least one of the first surface and the second surface; pressing the UV curable adhesive with a roller to form a preliminary micro-lens array layer, where a surface of the roller has a uneven shape matching the micro-lens array layer; and curing the preliminary micro-lens array layer by irradiating the preliminary micro-lens array layer with UV light.

In an exemplary embodiment of the present disclosure, the forming the micro-lens array layer on at least one of the first surface and the second surface includes: processing a mold plate with a laser to form a micro-lens-array-layer mold; forming a preliminary micro-lens array layer in the micro-lens-array-layer mold; and de-molding the preliminary micro-lens array layer to transfer to the at least one of the first surface and the second surface.

BRIEF DESCRIPTION OF THE DRAWINGS

Features described above, other features and advantages of the present disclosure will be clearer from detailed description of exemplary embodiments provided in conjunction with the accompanying drawings.

Figure 1:
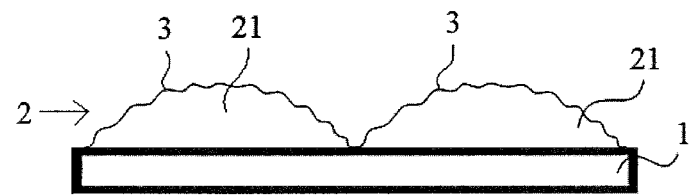
FIG. 1 is a schematic structural diagram of an implementation of an optical film structure provided by the present disclosure.

Reference signs of main elements in the drawings are described as follows:

1: substrate layer; 2: first micro-lens array layer; 21: micro-lens; 3: first diffusion layer; 4: second diffusion layer; 5: second micro-lens array layer; 6: upper base substrate; 7: lower base substrate; 8: liquid crystal layer; 9: sub-pixel electrode layer; 10: polarizer; l: edge length; h: arch height; r: curvature radius.

DETAILED DESCRIPTION

Hereinafter, the exemplary embodiments of the present disclosure are described in detail with reference to the accompanying drawings. However, the exemplary embodiments of the present disclosure may be embodied in many different forms and should not be construed as being limited to the embodiments set forth herein. Rather, these embodiments are provided so that the present disclosure will be thorough, and will fully convey the concepts of the exemplary embodiments to those skilled in the art. The same reference signs denote the same or similar structures in the accompany drawings, and thus the detailed description thereof will be omitted.

Figure 9:
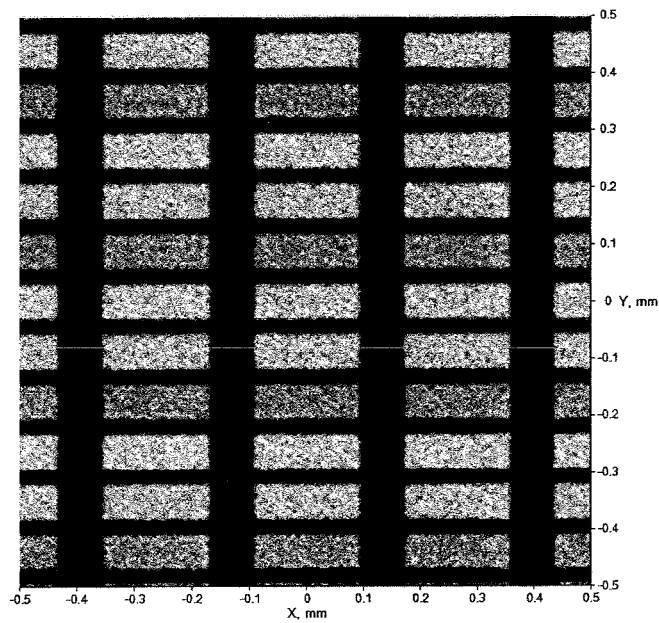
FIG. 9 is a schematic structural diagram of distribution of sub-pixels and a black matrix.

VR or AR display device usually has a wide display angle. However, pixels of a display screen are magnified several times when the display screen is magnified by lenses, such that display detail of individual pixel may be easily viewed by human eyes, leading to reduced picture clarity. A main cause of the above problem is that: the black matrix in the display screen is designed to be relatively wide so as to mask irregular drive wiring, as a result, after being magnified by VR imaging lens, the width the black matrix reaches the human visual resolution limit, such that human eyes may perceive the spatial matrix effect caused by the black matrix, which is called Screen Door Effect (as shown in FIG. 9), thereby lowering quality of displayed image.

To eliminate the Screen Door Effect, embodiments of the present disclosure provide an optical film structure, which may be applied to a VR/AR display screen as well as an ordinary display screen, such as a computer display screen and a TV display screen. Referring to FIG. 1, which is a schematic structural diagram of an implementation of an optical film structure provided by the present disclosure, the optical film structure may include a substrate layer 1, a first micro-lens array layer 2 (a micro-lens array layer provided on a first surface of the substrate layer is referred to as the first micro-lens array layer 2) and a first diffusion layer 3.

The substrate layer 1 has the first surface and a second surface opposite to each other. The first micro-lens array layer 2 is provided on the first surface and includes a plurality of micro-lenses 21 arranged in sequence, each of the plurality of micro-lenses 21 has an edge length smaller than an edge length of each of a plurality of sub-pixels, and edges of the adjacent micro-lenses abut on each other. The first diffusion layer 3 is provided on a surface of the first micro-lens array layer 2 away from the substrate layer 1, the first diffusion layer includes a plurality of uneven microstructures, and the first diffusion layer 3 is capable of scattering light rays going through the optical film structure.

In the exemplary implementation, the substrate layer 1 may be made from polyethylene terephthalate (PET) plastic. The PET plastic has excellent optical properties and weather resistance, and amorphous PET plastic has good optical transparency. In addition, PET plastic has good abrasion resistance, dimensional stability and electrical insulation.

Figure 4:
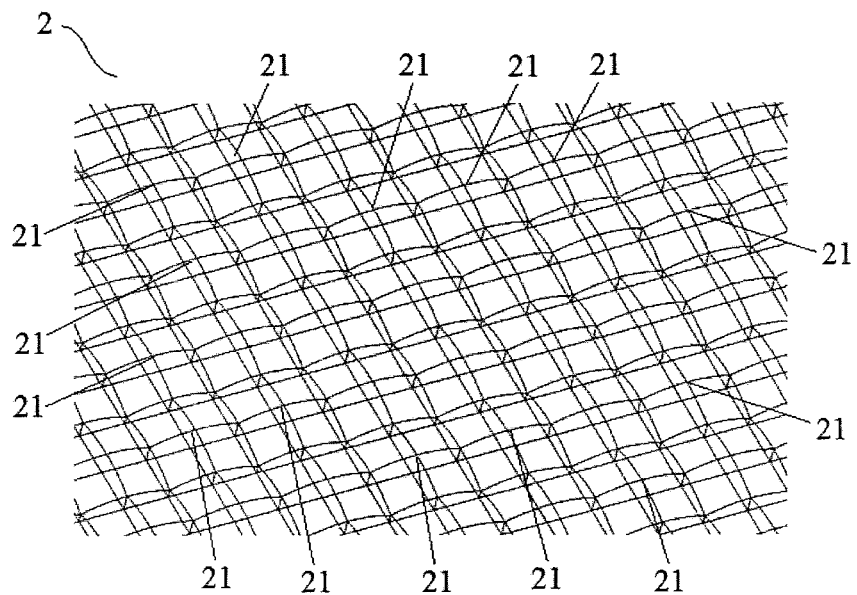
FIG. 4 is a schematic structural diagram of a first micro-lens array layer or a second micro-lens array layer as shown in FIG. 1, FIG. 2 or FIG. 3.

Referring to FIG. 4, which is a schematic structural diagram of the first micro-lens array layer 2, the first micro-lens array layer 2 may include a plurality of micro-lenses 21 arranged in sequence. The plurality of micro-lenses 21 is arranged in an array in two-dimensional space, i.e., the plurality of micro-lenses 21 is formed in a plane. Edges of the adjacent micro-lenses 21 abut on each other, i.e., the plurality of micro-lenses 21 is arranged closely without gap. Each micro-lens 21 is equivalent to a convex lens. Principal parameters of the micro-lens 21 include edge length 1, arch height h, curvature radius r, and the like.

The first micro-lens array layer 2 may be formed by UV curing. Specific process of the UV curing is: applying a UV curable adhesive on the first surface of the substrate layer 1; pulling the substrate layer 1 to a roller position, where a surface of the roller is provided with a uneven shape matching the first micro-lens array layer 2; pressing the UV curable adhesive with the roller to form the structures of micro-lenses 21, that is, form the first micro-lens array layer 2; and curing the first micro-lens array layer 2 by irradiating it with UV light. In other exemplary implementations of the present disclosure, the first micro-lens array layer 2 may be formed on the first surface of the substrate layer 1 by means of a demold-and-transfer method, which includes: processing a mold plate with a laser to form a first micro-lens-array-layer mold; forming the first micro-lens array layer 2 in the first micro-lens-array-layer mold; and de-molding the first micro-lens array layer 2 to transfer to the first surface of the substrate layer 1. The laser processing has low cost and low requirements on the fabrication process flow, and is easy to implement. In addition, the first micro-lens-array-layer mold may be machined by using ultra-high-precision cutting tools.

Edge lengths and/or heights of the micro-lenses 21 of the first micro-lens array layer 2 are not uniform and may be randomized. A difference in laser energies may lead to the size difference of the micro-lenses 21. For the first micro-lens array layer 2 formed by UV curing, the edge lengths and/or heights of the micro-lenses 21 may be randomized by setting different sizes for the rollers.

Figure 5:
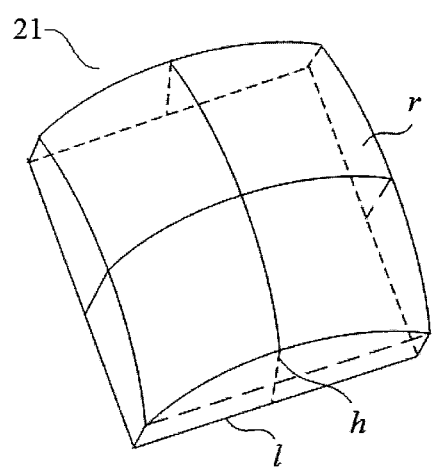
FIG. 5 is a schematic structural diagram of a micro-lens as shown in FIG. 4.
Figure 6:
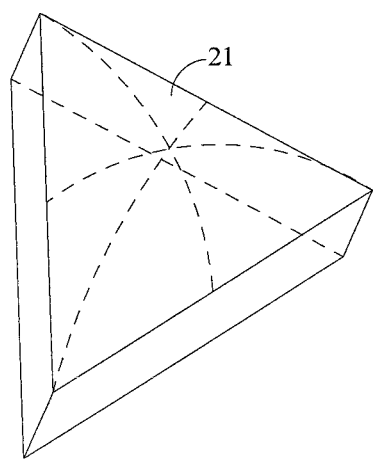
FIG. 6 is a schematic structural diagram of another implementation of a micro-lens.
Figure 7:
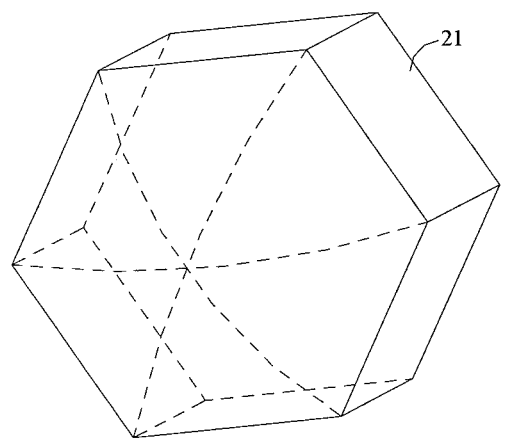
FIG. 7 is a schematic structural diagram of yet another implementation of a micro-lens.

Cross-sectional shapes, in a plane parallel to the first surface, of the micro-lenses 21 are one or more of rectangular, triangular or hexagonal shape. Referring to FIG. 5, which is a schematic structural diagram of a micro-lens 21, in the exemplary implementation, a cross-sectional shape, in a plane parallel to the first surface, of the micro-lens 21 is square. Micro-lenses 21 with a square or rectangular cross-sectional shape may significantly mitigate impact on image quality and reduce occurrence of abnormal defects in process flow; and square or rectangular shaped micro-lenses 21 are relatively easy to align in a line, in other words, edges between micro-lenses 21 are easy to form a straight line, such that it is easy for an alignment direction of the micro-lenses 21 to form a preset angle with respect to an alignment direction of the sub-pixels, to reduce the occurrence of abnormal pattern and the impact on the image quality. Referring to FIG. 6, which is a schematic structural diagram of another implementation of a micro-lens, a cross-sectional shape, in a plane parallel to the first surface, of the micro-lens 21 is triangular. Referring to FIG. 7, which is a schematic structural diagram of yet another implementation of a micro-lens, a cross-sectional shape, in a plane parallel to the first surface, of the micro-lens 21 is hexagonal. However, the present disclosure is not limited by these implementations; the cross-sectional shape, in the plane parallel to the first surface, of the micro-lens 21 may be other polygonal shape as long as the micro-lenses may be arranged closely and seamlessly (except for peripheral portion). It is easily understood that, in the case that the cross-sectional shape, in the plane parallel to the first surface, of the micro-lens 21 is triangular, hexagonal or another polygonal shape, edges of adjacent micro-lenses 21 abut on each other, that is, the plurality of micro-lenses 21 is arranged closely and seamlessly.

To eliminate Screen Door Effect and maintain image quality to the best extent possible, it is needed to configure suitable structural parameters of the micro-lenses 21 according to parameters such as screen size and resolution. In other words, micro-lenses 21 with a fixed set of parameters may be suitable for certain screen size with PPI value in a certain range. The focal length f of the micro-lens 21 satisfies:

$$\frac{l*t}{2*A} < f < \frac{t}{2},$$

in which $$A = \frac{3l}{2} - \frac{25.4}{PPI},$$

l is an edge length of the micro-lens 21, t is a distance between a side of the first micro-lens array layer 2 close to the display screen and a sub-pixel of the display screen, and PPI is an abbreviation of Pixels Per Inch and defines the quantity of sub-pixels on per inch of length of the display screen. When the PPI of the screen reaches certain value, graininess can't be perceived by human eyes.

l is the edge length of the micro-lens 21, which may be an equivalent edge length or a real edge length. In the case that the micro-lens is polygonal-shaped or irregular-shaped, etc., an area of a surface of the micro-lens that is in contact with the substrate layer may be calculated, then a square root of the area is calculated to obtain the equivalent edge length by considering an outer profile of the surface of the micro-lens that is in contact with the substrate layer to be equivalent to a square. In the case that the micro-lens is of a regular polygon shape, a measured edge length of the outer profile of the surface of the micro-lens that is in contact with the substrate layer is the real edge length.

The micro-lens 21 has a size smaller than that of the sub-pixel. In specific, an area of the surface of the micro-lens that is in contact with the substrate layer is smaller than an area of the sub-pixel. The area of the surface of the micro-lens that is in contact with the substrate layer may range from one ninth of the area of the sub-pixel to one time of the area of the sub-pixel, e.g., one fourth or one ninth of the area of the sub-pixel.

Further, the size may be an equivalent edge length or a real edge length. The calculation of the equivalent edge length of the micro-lens 21 is described in detail hereinbefore, and a calculation method of the equivalent edge length of the sub-pixel is the same as that of micro-lens 21, thus a repeated description thereof is omitted herein. In the case that both the sub-pixel and the micro-lens are of a regular polygon shape and have the same quantity of edges, the size may the real edge length. The area value may be converted to the equivalent edge length value or real edge length value, then the equivalent edge length or real edge length of the outer profile of the surface of the micro-lens that is in contact with the substrate layer may range from one third to one time of the edge length of the sub-pixel, e.g., a half or one third of the edge length of the sub-pixel.

In the exemplary implementation, sub-pixel is the smallest pixel, in specific, one red pixel, one green pixel and one blue pixel form one pixel unit, and the sub-pixel is the red pixel, the green pixel or the blue pixel in the pixel unit. A value of the PPI ranges approximately from 300 to 800; and a value of the edge length l of the micro-lens 21 ranges approximately from 20 μm to 40 μm.

In the exemplary implementation, a first diffusion layer 3 (the diffusion layer provided on the first micro-lens array layer 2 is referred to as the first diffusion layer 3) may further be provided on a surface (the surface is basically parallel to the first surface, but is uneven as it is a surface of the first micro-lens array layer 2) of the first micro-lens array layer 2 away from the substrate layer 1. The first diffusion layer 3 includes a plurality of uneven microstructures, that is, the first diffusion layer 3 is tiny, uneven and coarse structures formed on the first micro-lens array layer 2, and the first diffusion layer 3 may be configured to scatter light rays. A forming process of the first diffusion layer 3 may be: a surface of a mold for the first micro-lens array layer 2 may be processed directly to form tiny, uneven and coarse structures, and in this way, during the demold-and-transfer process of the first micro-lens array layer 2, the first diffusion layer 3 with the tiny, uneven and coarse structures may be formed on the first micro-lens array layer 2. Tiny, uneven and coarse structures may be provided on a roller, in this way, the first micro-lens array layer 2 which is formed by rolling with the roller may be provided with the first diffusion layer 3 with the tiny, uneven and coarse structures.

Figure 2:
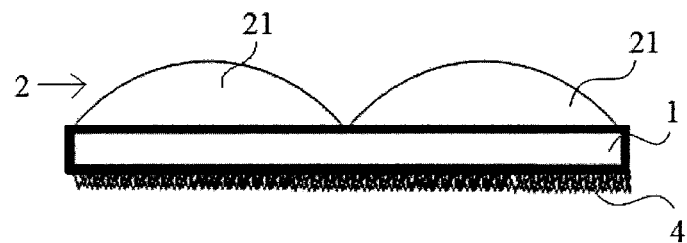
FIG. 2 is a schematic structural diagram of another implementation of an optical film structure provided by the present disclosure.

Referring to FIG. 2, a schematic structural diagram of another implementation of an optical film structure provided by the present disclosure is illustrated. This exemplary implementation differs from the exemplary implementation as shown in FIG. 1 in that: a second diffusion layer 4 is provided on the second surface of the substrate layer 1 (the diffusion layer provided on the second surface is referred to as the second diffusion layer 4), while the first diffusion layer 3 is not provided on the surface of the first micro-lens array layer 2 away from the substrate layer 1. Structures of the substrate layer 1 and the first micro-lens array layer 2 are the same as those in the exemplary implementation as shown in FIG. 1, thus a repeated description thereof is omitted herein. Further, it is appreciated by a person skilled in the art that, when the first diffusion layer 3 may be provided on the surface of the first micro-lens array layer 2 away from the substrate layer 1, the second diffusion layer 4 may also be provided on the second surface of the substrate layer 1.

Figure 3:
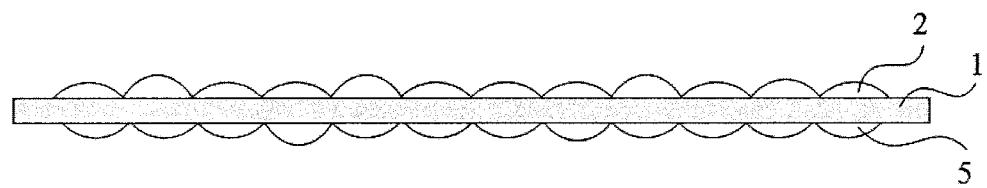
FIG. 3 is a schematic structural diagram of yet another implementation of an optical film structure provided by the present disclosure.

Referring to FIG. 3, a schematic structural diagram of yet another implementation of an optical film structure provided by the present disclosure is illustrated. This exemplary implementation differs from the exemplary implementation as shown in FIG. 1 in that: a second micro-lens array layer 5 is provided on the second surface of the substrate layer 1 (the micro-lens array layer provided on the second surface of the substrate layer is referred to as the second micro-lens array layer 5). The specific structure of the second micro-lens array layer 5 is the same as the specific structure of the first micro-lens array layer 2, that is, the second micro-lens array layer 5 includes a plurality of micro-lenses arranged in sequence, each micro-lens has a size smaller than that of a sub-pixel, and edges of the adjacent micro-lenses abut on each other; and the manufacturing method of the second micro-lens array layer 5 may be the same as well, thus a repeated description thereof is omitted herein. The structure with two micro-lens array layers may prevent the screen image abnormal point phenomenon which is due to differences between micro-lenses 21, and alleviate the effect of screen glare caused by using a single micro-lens array layer structure. The occurrence of glare is reduced, since a combined refraction of light achieved by the two micro-lens array layers enhances the randomness of light ray propagation direction. In other exemplary implementations provided by the present disclosure, a combination of multiple micro-lens array layers may be utilized to eliminate the Screen Door Effect desirably.

Figure 8:
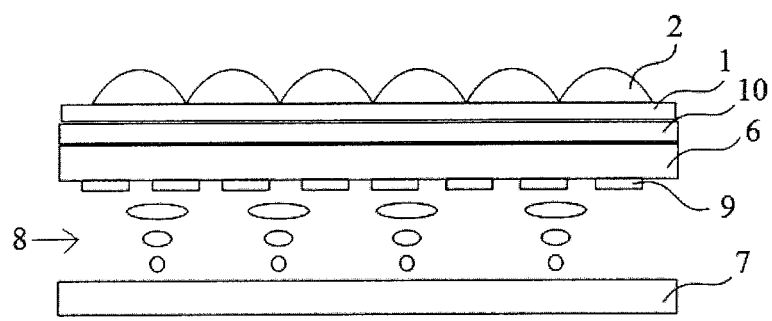
FIG. 8 is a schematic structural diagram of a display device provided by the present disclosure.

The optical film structure according to the embodiments of the present disclosure is applicable to a display device. Referring to FIG. 8, a schematic structural diagram of a display device provided by embodiments of the present disclosure is illustrated. The display device may include a display screen and the aforementioned optical film structure, and the optical film structure is provided on a light exiting side of the display screen. A specific structure of the optical film structure is described in detail hereinbefore, and a repeated description thereof is omitted herein.

An alignment direction of the micro-lenses 21 of the optical film structure is at a set angle (also called a first angle) to an alignment direction of the sub-pixels of the display screen. The set angle may eliminate phenomena that may result from overlapping two layers of films, such as moire pattern and Newton ring. In the exemplary implementation, the set angle may be about 18.4 degrees, and the set angle may also be about 33.7 degrees, 45 degrees, etc.

In the exemplary implementation, the display screen may include an upper base substrate 6, a lower base substrate 7, a liquid crystal layer 8, a sub-pixel electrode layer 9, a polarizer 10, etc. The upper base substrate 6 and the lower base substrate 7 may be arranged opposite to each other, the liquid crystal layer 8 may be disposed between the upper base substrate 6 and the lower base substrate 7; the sub-pixel electrode layer 9 may be arranged on a side of the upper base substrate 6 close to the lower base substrate 7; the polarizer 10 is arranged on a side of the upper base substrate 6 away from the lower base substrate 7. The display screen may be a liquid crystal display screen, or other display screen with a sub-pixel structure, such as an Organic Light Emitting Diode (OLED) display screen and a Micro Light Emitting Diode display screen. The t in the foregoing formula is a sum of a thickness of the substrate layer 1, a thickness of the polarizer 10 and a thickness of the upper base substrate 6. If an OLED screen or another display screen is employed, the t refers to a distance between a side of the micro-lens array layer close to the display screen and a tri-primary-colors pixel layer.

Figure 12:
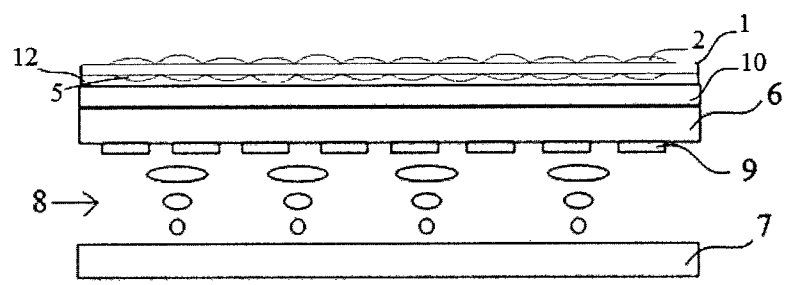
FIG. 12 is a schematic structural diagram of a display device provided by the present disclosure.

In the case that only the first micro-lens array layer 2 is provided on the substrate layer 1, the second surface of the substrate layer 1 may be directly attached to a light exiting surface of the polarizer 10 by suction, or may be adhered to the light exiting surface of the polarizer 10. However, in the case that the second surface of the substrate layer 1 is provided with the second micro-lens array layer 5, due to unevenness of the second micro-lens array layer 5, the second micro-lens array layer 5 can't be attached to a screen surface by suction, thus an adhesive layer 12 (as shown in FIG. 12) is needed, which is disposed between the optical film structure and the display screen. In the exemplary implementation, the adhesive layer is disposed between the optical film structure and the polarizer 10 and may be for adhering the optical film structure to a light exiting side of the polarizer 10. In the case that the display screen is not provided with a polarizer, the adhesive layer may be disposed between the optical film structure and the upper base substrate 6, or, in the case that an additional structure is provided on the polarizer, the adhesive layer may be disposed between the optical film structure and the additional structure.

Figure 11:
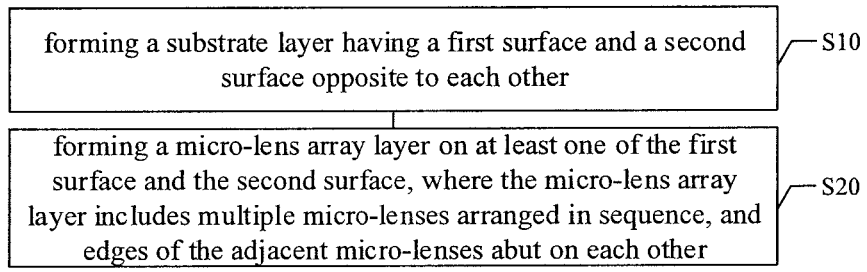
FIG. 11 is a schematic flow diagram of a method of manufacturing an optical film structure.

Referring to FIG. 11, which is a schematic flow diagram of a method of manufacturing an optical film structure, embodiments of the present disclosure further provide a method of manufacturing an optical film structure, which corresponds to the foregoing optical film structure. The method of manufacturing the optical film structure may include the following steps.

Step S10: forming a substrate layer having a first surface and a second surface opposite to each other.

Step S20: forming a micro-lens array layer on at least one of the first surface and the second surface. The micro-lens array layer includes a plurality of micro-lenses arranged in sequence, and edges of the adjacent micro-lenses abut on each other.

In the exemplary implementation, the forming the micro-lens array layer on at least one of the first surface and the second surface includes: applying a UV curable adhesive on the at least one of the first surface and the second surface; pressing the UV curable adhesive with a roller to form a preliminary micro-lens array layer; and curing the preliminary micro-lens array layer by irradiating the preliminary micro-lens array layer with UV light.

In the exemplary implementation, the forming the micro-lens array layer on at least one of the first surface and the second surface includes: processing a mold plate with a laser to form a micro-lens-array-layer mold; forming a preliminary micro-lens array layer in the micro-lens-array-layer mold; and de-molding the preliminary micro-lens array layer to transfer to the at least one of the first surface and the second surface.

In the above description of the optical film structure, the manufacturing method of the optical film structure is described in detail, thus a repeated description thereof is omitted herein.

Figure 10:
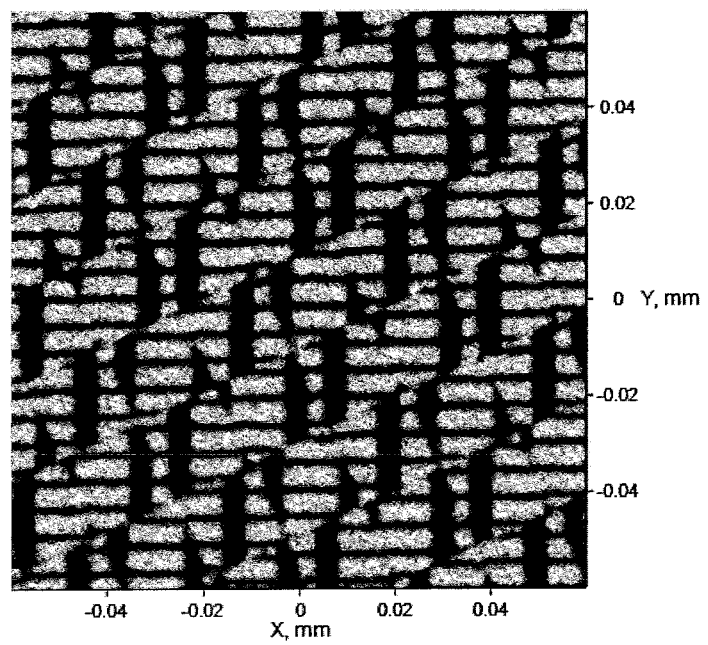
FIG. 10 is a schematic diagram of a display effect of a display device provided with an optical film structure according to the present disclosure.

Referring to FIG. 9, a schematic structural diagram of distribution of sub-pixels and a black matrix is illustrated. Generally, in a direction where the black matrix has a maximum width, the width of the black matrix accounts for approximately one fourth to one third of a pixel width. Therefore, if the screen resolution is not sufficient, an obvious space grid effect, known as Screen Door Effect, occurs when the sub-pixels are magnified by the VR imaging lens, thus impacting image quality. Referring to FIG. 10, a schematic diagram of a display effect of a display device provided with the optical film structure according to the present disclosure is illustrated. Since the size of a single micro-lens 21 is smaller than that of a sub-pixel, the pixel display effect as seen through the micro-lenses 21 undergoes significant changes to the extent that the original arrangement of the black matrix seems altered, thereby eliminating the Screen Door Effect and improving image quality.

The display device provided by the embodiments of the present disclosure includes the optical film structure. The optical film structure includes: the micro-lens array layer, provided on at least one of the first surface and the second surface of the substrate layer, and including the plurality of micro-lenses arranged in sequence. Each of the plurality of micro-lenses has a size smaller than a size of each of the plurality of sub-pixels, and edges of the adjacent micro-lenses abut on each other. On one hand, since the edge length of the micro-lens is smaller than that of the sub-pixel, light rays of the same sub-pixel and black matrix are inevitably refracted by different micro-lenses, and the display effect of the sub-pixel and black matrix after the refraction of the micro-lenses undergoes significant changes to the extent that the original arrangement of the black matrix seems altered. Therefore, the micro-lens array layer may distort an appearance of the original horizontal and vertical arrangement of the black matrix which is relatively wide in the display screen, to eliminate the regularity in the arrangement of the black matrix, thereby mitigating the impact of Screen Door Effect on the display effect. On the other hand, since edges of the adjacent micro-lenses abut on each other, the micro-lens array layer may bring a change to the display effects of all the sub-pixels and black matrix in the display screen. Further, by using the optical film structure, a requirement on the display screen resolution may be lowered while the user experience is not degraded, thus reducing costs.

The foregoing features, structures or characteristics may be combined in one or more embodiments in any suitable manner, and if possible, the discussed features in the embodiments are interchangeable. In the above description, many details are provided to facilitate an adequate understanding of the embodiments of the present disclosure. However, it should be understood by a person skilled in the art that the technical solutions of the present disclosure can be implemented without one or more of these specific details, or, other methods, components and materials may be used instead. In other cases, the known structures, materials or operations are not shown or described in detail so as to avoid obscuring the aspects of the present disclosure.

Terms like "about" and "approximate" are used in the specification to represent an amount within 20%, preferably 10%, and more preferably 5% of a certain value or range. The amount herein is an approximate value, that is, also implies the meaning of "about" and "approximate" without being specified.

Although relativeness terms, such as "upper" and "lower", are used herein to describe an element's relationship to another element as illustrated in the drawings, the relativeness terms are used for ease of description only, e.g., according to an exemplary orientation illustrated in the drawings. It is understood that, if the device in the figures is turned over, elements which are described as "upper" elements would then be "lower" elements. When a structure is depicted as "on" another structure, it may refer to that the structure is formed integrally on another structure, or the structure is provided directly on another structure, or the structure is provided on another structure indirectly via a still another structure.

In the specification, terms "a", "an", "the" and "at least one" are used to represent that one or more elements, components or the like may exist; terms "comprise", "include", and "have" are inclusive and intended to mean that, besides the listed element, component or the like, additional element, component or the like may exist; and terms "first", "second", "third" and the like are used as labels only, and are not intended to be a limitation of the number of subject.

It is understood that, application of the present disclosure is not to be limited to the specific structures and layouts of the components set forth herein. The present disclosure is capable of having other embodiments and can be implemented and realized in a variety of ways. The foregoing variants and modifications fall within the scope of the present disclosure. It is understood that, the disclosure disclosed and defined in the specification extends to all optional combinations of two or more individual features mentioned explicitly or implicitly in the description and/or drawings. All these combinations form multiple optional aspects of the present disclosure. The embodiments of the specification provide description of the best mode known for practicing the present disclosure and enable those skilled in the art to make use of the present disclosure.

What is claimed is:

1. A display device, comprising: a display screen and an optical film structure arranged on a light exiting side of the display screen, wherein the display screen comprises a plurality of sub-pixels, and the optical film structure comprises:
    a substrate layer, having a first surface and a second surface opposite to each other, wherein the first surface is arranged at a side of the second surface away from the display screen, and
    a micro-lens array layer, provided on at least one of the first surface and the second surface, and comprising a plurality of micro-lenses arranged in an array, wherein each of the plurality of micro-lenses has a size smaller than a size of each of the plurality of sub-pixels, and edges of the adjacent micro-lenses abut on each other; wherein:
    the micro-lens array layer is arranged on the first surface; the optical film structure further comprises a diffusion layer provided on at least one of a surface of the micro-lens array layer away from the substrate layer and the second surface; and the diffusion layer comprises a plurality of uneven microstructures; or,
    the micro-lens array layer is provided on each of the first surface and the second surface; the optical film structure further comprises a diffusion layer provided on a surface of the micro-lens array layer away from the substrate layer; and the diffusion layer comprises a plurality of uneven microstructures.

2. The display device according to claim 1, wherein the micro-lens array layer is arranged on the first surface; the optical film structure comprises the diffusion layer provided on a surface of the micro-lens array layer away from the substrate layer; and the second surface is connected to the display screen.

3. The display device according to claim 2, wherein the display screen comprises a polarizer; and the second surface is directly attached to the polarizer by suction.

4. The display device according to claim 2, wherein the display screen comprises a polarizer; and the second surface is adhered to the polarizer.

5. The display device according to claim 1, wherein the micro-lens array layer is provided on each of the first surface and the second surface;
the optical film structure comprises the diffusion layer provided on a surface of the micro-lens array layer away from the substrate layer; and
the display device further comprises an adhesive layer provided between the micro-lens array layer on the second surface and the display screen.

6. The display device according to claim 1, wherein a focal length f of each of the plurality of micro-lenses satisfies:

$$\frac{l*t}{2*A} < f < \frac{t}{2},$$

where $$A = \frac{3l}{2} - \frac{25.4}{PPI},$$

l is an edge length of the micro-lens, t is a distance between a side of the micro-lens array layer close to the display screen and a sub-pixel of the display screen, and PPI is the quantity of the sub-pixels per inch of the display screen.

7. The display device according to claim 6, wherein the display screen comprises an upper base substrate, a lower base substrate, a liquid crystal layer, a sub-pixel electrode layer and a polarizer; the upper base substrate and the lower base substrate are arranged opposite to each other, the liquid crystal layer is disposed between the upper base substrate and the lower base substrate; the sub-pixel electrode layer is arranged on a side of the upper base substrate close to the lower base substrate; the polarizer is arranged on a side of the upper base substrate away from the lower base substrate; and
    the micro-lens array layer is arranged on the first surface; the second surface is directly attached to the polarizer by suction; and t is a sum of a thickness of the substrate layer, a thickness of the polarizer and a thickness of the upper base substrate.

8. The display device according to claim 7, wherein the optical film structure comprises the diffusion layer provided on a surface of the micro-lens array layer away from the substrate layer.

9. The display device according to claim 1, wherein heights and/or edge lengths of the micro-lenses are randomly distributed.

10. The display device according to claim 1, wherein an alignment direction of the micro-lenses of the optical film structure is at an angle to an alignment direction of the sub-pixels of the display screen.

11. The display device according to claim 10, wherein the angle is 18.4 degrees, 33.7 degrees or 45 degrees.

12. The display device according to claim 1, further comprising:
    an adhesive layer, provided between the optical film structure and the display screen, configured to adhere the optical film structure to the light exiting side of the display screen.

13. An optical film structure, comprising:
    a substrate layer, having a first surface and a second surface opposite to each other, and
    a micro-lens array layer, provided on at least one of the first surface and the second surface, and comprising a plurality of micro-lenses arranged in an array, wherein edges of the adjacent micro-lenses abut on each other; wherein:

the micro-lens array layer is arranged on the first surface; the optical film structure further comprises a diffusion layer provided on at least one of a surface of the micro-lens array layer away from the substrate layer and the second surface; and the diffusion layer comprises a plurality of uneven microstructures; or, the micro-lens array layer is provided on each of the first surface and the second surface; the optical film structure further comprises a diffusion layer provided on a surface of the micro-lens array layer away from the substrate layer; and the diffusion layer comprises a plurality of uneven microstructures.

14. A method of manufacturing an optical film structure, comprising:

forming a substrate layer having a first surface and a second surface opposite to each other;

forming a micro-lens array layer on at least one of the first surface and the second surface, wherein the micro-lens array layer comprises a plurality of micro-lenses arranged in an array, and edges of the adjacent micro-lenses abut on each other; wherein:

the micro-lens array layer is arranged on the first surface; the optical film structure further comprises a diffusion layer provided on at least one of a surface of the micro-lens array layer away from the substrate layer and the second surface; and the diffusion layer comprises a plurality of uneven microstructures; or, the micro-lens array layer is provided on each of the first surface and the second surface; the optical film structure further comprises a diffusion layer provided on a surface of the micro-lens array layer away from the substrate layer; and the diffusion layer comprises a plurality of uneven microstructures.

15. The method according to claim 14, wherein the forming the micro-lens array layer on at least one of the first surface and the second surface comprises:

coating an ultraviolet curable adhesive on the at least one of the first surface and the second surface;

pressing the ultraviolet curable adhesive with a roller to form a preliminary micro-lens array layer, wherein a surface of the roller has a uneven shape matching the micro-lens array layer; and curing the preliminary micro-lens array layer by irradiating the preliminary micro-lens array layer with ultraviolet light, to form the micro-lens array layer.

16. The method according to claim 14, wherein the forming the micro-lens array layer on at least one of the first surface and the second surface comprises:

processing a mold plate with a laser to form a micro-lens-array-layer mold;

forming a preliminary micro-lens array layer in the micro-lens-array-layer mold; and de-molding the preliminary micro-lens array layer to transfer to the at least one of the first surface and the second surface.

17. The display device according to claim 1, wherein a cross-sectional shape, in a plane parallel to the first surface, of the micro-lens is rectangular, triangular or hexagonal.

* * * * *